United States Patent [19]

Kawano et al.

[11] Patent Number: 5,326,601

[45] Date of Patent: Jul. 5, 1994

[54] GLASS ARTICLE HAVING A RESIN LAMINATE BONDED THERETO

[75] Inventors: Nagahiro Kawano; Michiaki Aikawa; Kiyoshi Esaki, all of Kurume, Japan

[73] Assignee: Tsukihoshi Kasei Kabushiki Kaisha, Kurume, Japan

[21] Appl. No.: 863,309

[22] PCT Filed: Nov. 7, 1991

[86] PCT No.: PCT/JP91/01525

§ 371 Date: Jul. 13, 1992

§ 102(e) Date: Jul. 13, 1992

[87] PCT Pub. No.: WO92/11137

PCT Pub. Date: Jul. 9, 1992

[30] Foreign Application Priority Data

Dec. 24, 1990 [JP] Japan ................. 2-418420

[51] Int. Cl.$^5$ ............. B32B 1/08; B32B 17/10; B32B 25/08

[52] U.S. Cl. ............. 428/34.7; 428/34.6; 428/413; 428/424.2; 428/424.8; 428/441

[58] Field of Search ........... 428/34.6, 34.7, 413, 428/424.2, 423.5, 424.8, 425.6, 441, 442; 524/163, 238, 301; 523/414, 415

[56] References Cited

U.S. PATENT DOCUMENTS

| | | | |
|---|---|---|---|
| 3,756,974 | 9/1973 | Buchheim et al. | 524/822 X |
| 4,163,814 | 8/1979 | Asai et al. | 427/372.2 |
| 4,171,056 | 10/1979 | Hannon et al. | 428/34.7 X |
| 4,745,152 | 5/1988 | Fock et al. | 524/718 |
| 4,925,885 | 5/1990 | Rosthauser et al. | 523/415 |

FOREIGN PATENT DOCUMENTS 49-9519  1/1974  Japan.
53-27732  8/1978  Japan.

OTHER PUBLICATIONS

Encyclopedia of Polymer Science and Engineering, vol. 17, p. 220 (1989).

*Primary Examiner*—D. S. Nakarani
*Attorney, Agent, or Firm*—Oblon, Spivak, McClelland, Maier & Neustadt

[57] ABSTRACT

A resin laminate for coating of glass comprises (A) an inner coating layer formed with a resin composition comprising a styrene-butadiene copolymer latex and polyvinylpyrrolidone and (B) an outer coating layer formed with a resin composition comprising an aqueous polyurethane, an aqueous epoxy resin, an aqueous amino resin and a surface active agent containing halogen.

By forming two coating layers of the resin laminate on the surface of a glass container such as a glass bottle and a window pane, the scattering of the broken pieces of glass can be prevented when the glass container or the glass pane is broken. The coating layers are not separated from the surface of the glass or swollen during the alkaline washing of the glass bottle and the like and thus are very useful for practical application.

7 Claims, No Drawings

GLASS ARTICLE HAVING A RESIN LAMINATE BONDED THERETO

TECHNICAL FIELD

The present invention relates to a resin laminate for coating of glass. More particularly, the present invention relates to a resin laminate for coating of glass having a high degree of required properties such as high adhesive strength to glass, preventive property of scattering of the broken pieces of glass under fracture and property required in view of the safety of glass products, e.g. glass bottles, during production and transportation.

BACKGROUND ART

Glass products, particularly glass containers, have been widely utilized in the fields of foods, medicines, agricultural chemicals and the like. Glass containers have problems that they are fragile due to their lower impact strengths and that the broken pieces of glass cause injury and other accidents due to their very sharp edges.

Recently, methods of coating the surface of glass with a resin layer have been disclosed for the purpose of eliminating the problems described above.

For the purpose of protection of glass, one of such methods (a) comprises coating the surface of glass with a resin layer formed with an aqueous polyurethane composition (Japanese Laid-open Patent Application Showa 52-59657) and another of such methods (b) comprises coating the surface of a glass bottle with an inner coating layer of styrene-butadiene copolymer rubber latex (hereinafter referred to as SBR latex) and an outer coating layer of an aqueous polyurethane formed on the outer surface of the inner coating layer.

The aqueous polyurethane is widely utilized for coating of glass bottles because it has good mechanical strength and weather resistance and hence is useful for repeated utilization of glass bottles. The SBR latex is also widely utilized for coating of glass bottles due to its superior elongation and its good adhesive property to the surface of the glass bottles and is useful for prevention of scattering broken pieces of glass under fracture. Another reason why these materials are widely utilized is that they are favorable in view of the handling and the working environment because they are both aqueous materials.

However, conventional constitutions of the resin laminates for coating glass, as described above, have various problems as follows. Since the aqueous polyurethanes are generally inferior in levelling property, wettability and flow extension property, there are the problems that they forms many uneven parts caused by undulated bands, etc. during the drying process and thus provide the inferior appearance of the bottles prepared. Furthermore, they have inferior resistance to alkalis. When bottles are washed before filling them with drinking water and the like, the dried coating layer is often swollen due to the alkalinity of the washing solution. Thus, the coating layers can not be applied for the repeated use of the glass bottles.

Since the SBR latexes have lower swollen gel strength in the coating and the drying of the surface of the glass bottles, cracks, such as crazes, are easily formed on the surface of the coating to provide the inferior appearance of the glass bottles.

Even when the surface of the SBR coating layer is coated with the above dry coating layer of an aqueous polyurethane, the cracks are seen through the outer layer from outside. It is difficult that the cracks are completely filled with the coating layer and thus the commercial value of the bottles are deteriorated.

DISCLOSURE OF THE INVENTION

Extensive investigations were undertaken for solving the problems described above and providing a resin laminate for coating of glass which can prevent scattering of broken pieces of glass under fracture and can be utilized for window panes and glass bottles.

It was found that a resin laminate comprising both an inner coating layer formed with a resin composition comprising a styrene-butadiene latex as the main component thereof and an outer layer formed with a resin composition comprising an aqueous polyurethane as the main component thereof is effective for solving the above problems. The present invention has been completed as the result of the knowledge described above.

The present invention accordingly has the object to provide a resin laminate for coating of glass which can be utilized repeatedly, has excellent impact strength, can prevent scattering of broken pieces of glass under fracture and can be utilized for window panes, glass bottles and the like.

Thus, the present invention provides a resin laminate for coating of glass which comprises (A) an inner coating layer formed with a resin composition comprising a styrene-butadiene copolymer latex and polyvinylpyrrolidone wherein the content of the polyvinylpyrrolidone in the resin composition is in the range from 0.2 to 1.0 weight parts (solid content), preferably in the range from 0.3 to 0.7 weight parts (solid content), based on 100 weight parts (solid content) of the styrene-butadiene latex and (B) an outer coating layer formed with a resin composition comprising an aqueous polyurethane, an aqueous epoxy resin, an aqueous amino resin and a surface active agent containing halogen wherein the contents of the aqueous epoxy resin, the aqueous amino resin and the surface active agent containing halogen in the resin composition are in the ranges from 10 to 60 weight parts (solid content), from 10 to 70 weight parts (solid content) and from 0.05 to 1.0 weight parts, respectively, and preferably in the range from 15 to 40 weight parts (solid content), from 15 to 50 weight parts (solid content) and from 0.1 to 0.8 weight parts, respectively, based on 100 weight parts (solid content) of the aqueous polyurethane.

THE MOST PREFERRED EMBODIMENT TO CARRY OUT THE INVENTION

The SBR latex for the inner coating layer utilized in the present invention is a rubber latex prepared by copolymerization of styrene monomer with butadiene.

The SBR latex utilized in the invention can be prepared by various methods and the methods of preparation are not particularly limited. As an example of the methods of preparation, butadiene, styrene and a modifier such as a mercaptane are added into a dilute solution of resin acid soap or rosin acid soap and the reaction is effected at the temperature between 50° and 60° C. when potassium persulfate and the like are utilized as the catalyst, and at the temperature between 4° and 10° C. when a peroxide such as an organic hydroperoxide is utilized as the catalyst. When potassium persulfate and the like are utilized as the catalyst, a polymerization terminating agent, such as tertiary-butylhydroquinone, dinitrochlorobenzene and the like, is added to the reaction mixture to terminate the reaction when the conversion of the polymerization reaches about 70 to 75%. When a peroxide is utilized as the catalyst, a polymerization terminating agent such as the same compounds as described above is added to the reaction mixture to terminate the reaction when conversion of the polymerization reaches about 55 to 65%. The SBR latex is prepared by removing unreacted-remaining butadiene and styrene after the termination of the polymerization. The SBR latex thus prepared comprises a copolymer containing 23 to 40% of copolymerized styrene and particles of an average diameter of 0.05 to 0.35 microns. In the present invention, it is particularly preferable that the SBR latex is modified with acrylic compounds to improve weather resistance.

The polyvinylpyrrolidone can be prepared by the following method. An aqueous solution of vinylpyrrolidone, such as N-vinyl-2-pyrrolidone, is polymerized by using a peroxide catalyst polymer in the presence of a small amount of ammonia, the polymer prepared is dried to the form of powder and preferably, it is dissolved in water to make a solution. The polyvinylpyrrolidone is compounded with the SBR latex in the amount in the range from 0.2 to 1.0 weight parts (solid content), preferably in the range from 0.3 to 0.7 weight parts (solid content), based on 100 weight parts (solid content) of the SBR latex. When the amount compounded in the composition is less than 0.2 weight parts, cracks in the dried inner coating layer formed by the use of the SBR latex can not be eliminated and, when the amount compounded in the composition is more than 1.0 weight parts, the stability of viscosity and fluidity of the SBR latex are deteriorated.

As the aqueous polyurethane comprised in the composition forming the outer coating layer, a self emulsified polyurethane prepared by introduction of ion centers into the polymer, a polyurethane prepared by chain extension by using amine straight chain extenders in an emulsified state, a blocked isocyanate using a blocking agent of water dispersion type, a polyurethane prepared by forced emulsification of polyurethane in an aqueous emulsifier solution and the like can be utilized.

As the aqueous epoxy resin, a polymer soluble in water or emulsified in water of a compound having two or more epoxy groups is utilized. Examples of the aqueous epoxy resin include polymers of diepoxy compounds prepared by etherification of 1 mole of a glycol, such as ethylene glycol, diethylene glycol, triethylene glycol, polyethylene glycol, propylene glycol, dipropylene glycol, 1,4-butanediol, 1,6-hexaneglycol, neopentylglycol and the like, with 2 moles of epichlorohydrine; polymers of polyepoxy compounds prepared by etherification of 1 mole of a polyhydric alcohol, such as glycerol, polyglycerol, trimethylolpropane, pentaerythritol, sorbitol and the like, with 2 moles or more of epichlorohydrine; and polymers of diepoxy compounds prepared by esterification of 1 mole of a dicarboxylic acid, such as phthalic acid, terephthalic acid, oxalic acid, adipic acid and the like, with 2 mole of epichlorohydrin. The aqueous epoxy resin is compounded in the resin composition forming the outer coating layer in the amount in the range from 10 to 60 weight parts (solid content), preferably from 15 to 40 weight parts (solid content), based on 100 weight parts (solid content) of the aqueous polyurethane.

As the aqueous amino resin, aqueous solutions of melamine resins, urea resins, guanamine resins and the like resins are utilized. Aqueous solutions of acidic colloids of melamine formaldehyde resins are preferably utilized. The aqueous amine resin is compounded in the resin composition forming the outer coating layer in the amount in the range from 10 to 70 weight parts (solid content), preferably from 15 to 50 weight parts (solid content), based on 100 weight parts (solid content) of the aqueous polyurethane.

When the amount of the aqueous epoxy resin is less than 10 weight parts (solid content) or the amount of the aqueous amino resin is less than 10 weight parts (solid content), both based on 100 weight parts of the aqueous polyurethane (solid content), the outer coating layer has inferior resistance to alkalis and is not favorably utilized. When the amount of the aqueous epoxy resin is more than 60 weight parts (solid content) or the amount of the aqueous amino resin is more than 70 weight parts (solid content), both based on 100 weight parts of the aqueous polyurethane (solid content), the outer coating layer has an improved resistance to alkalis. However, in any of these conditions, viscosity of the liquid mixture of these components is increased to cause inferior workability, lower elastic modulus of the dried coating layer and, thus, the property of preventing the broken pieces of glass from scattering is deteriorated. Thus, the coating layers prepared in these conditions are not favorably utilized.

When both of the aqueous epoxy resin and the aqueous amino resin are not simultaneously utilized but the aqueous epoxy resin alone is compounded to the aqueous polyurethane in a larger amount, for example, in an amount exceeding 60 weight parts based on 100 weight parts (solid content) of the aqueous polyurethane, the resistance to alkalis is improved but viscosity of the liquid mixture is increased to deteriorate smoothness of the coating layer formed with the material. Thus, the coating layer prepared in this condition is not favorably utilized. When the aqueous amino resin alone is compounded to the aqueous polyurethane in a larger amount, for example, in an amount exceeding 70 weight parts (solid content) based on 100 weight parts (solid content) of the aqueous polyurethane, the resistance to alkalis and the smoothness of the coating layer formed are maintained but the elastic modulus of the coating layer is decreased. Thus, the coating layer prepared in this condition is not favorably utilized. In the outer coating layer, both of the aqueous epoxy resin and the aqueous amino resin are necessarily utilized simultaneously in amounts specified in the above descriptions.

As the surface active agent containing halogen, surface active agents containing fluorine are preferable. Surface active agents comprising perfluorocarbon groups are more preferable. Examples of the surface active agents comprising perfluorocarbon groups utilized in the present invention include sodium perfluorohexenyloxybenzenesulfonate, potassium perfluoroalkylcarboxylates, fluorinated alkyl esters and the like. The surface active agent containing halogen is compounded in the resin composition forming the outer coating layer in the amount in the range from 0.05 to 1 weight parts (solid content), preferably from 0.1 to 0.8 weight parts (solid content), based on 100 weight parts (solid content) of the aqueous polyurethane.

When the amount of the surface active agent containing halogen is less than 0.05 weight parts as the solid content, based on the solid material in the homogeneous solution for forming the dried outer coating layer comprising 100 weight parts of the aqueous polyurethane, 10 to 60 weight parts of the aqueous epoxy resin and 10 to 70 weight parts of the aqueous amino resin, the uneven coating on the coating layer, such as circumferential ridges on the outer coating, can not be eliminated. When the amount of the surface active agent containing halogen is more than 1 weight parts, bubbles remain in the coating layer to lower commercial value of the product. Thus, the coating layers prepared in these conditions are not favorably utilized.

In the liquid resin compositions prepared in the present invention, additives, such as agents for protection against ultraviolet, antioxidants, and agents for improvement of surface-printing, and coloring agents like various kinds of pigments, may be added according to the application. When these additives are added into the resin composition forming the outer coating layer to prepare a homogeneous solution, the durability of the coating layer can be enhanced.

The ratio of the thickness of the inner coating layer and the thickness of the outer coating layer is 1-16: 0.5-15, preferably 3-12: 1-10.

By utilizing the composition as specified above, the swollen gel strength of SBR latex is increased, and cracks generally formed on the dried coating layer can be eliminated because the polyvinylpyrrolidone itself has a high swollen gel strength and the good compatibility with the SBR latex. The aqueous epoxy resin and the aqueous amino resin increase the crosslinking density of the dried coating layer and, thus, the resistance of the coating layer to chemicals, particularly the resistance to alkalis, is improved. The surface active agent comprising perfluorocarbon groups improves the levelling property because it has a similar ionic character to the aqueous polyurethane. and has a superior permeability.

The present invention will be understood more readily with reference to the following examples; however these examples are intended to illustrate the invention and are not to be construed to limit the scope of the invention.

EXAMPLES 1-5 AND COMPARATIVE EXAMPLES 1-5

Tests of the properties of the inner coating layer

To 100 weight parts (solid content) of SBR latex modified with acrylic compounds which is Soft S A-3 (a product of Dainippon Ink Chemical Industry Co., Ltd., containing 45 weight % of solid components and having pH of 8.5-9.5, viscosity of 200-300 cps (25° C.) and acrylic content of 20-30%), 30% aqueous solution of polyvinylpyrrolidone of the reagent grade #1 having a number average molecular weight of 10000 was added in a varied amount as shown in Table 1. After the mixture of homogeneous composition was obtained, a coating was prepared.

The method for preparing the coating layer was as follows.

A glass bottle was held horizontally and dipped into the composition for the coating solution while it was rotated at the speed of 5-30 rpm. The coated bottle was held horizontally and dried in a drying oven of 80°-130° C. while it was rotated at the speed of 5-30 rpm.

The coated layer thus prepared was tested for evaluation of the properties.

Items of the tests:

① Viscosity (cps) was measured as the index for workability of the coating operation.

② Tensile strength ($kg/cm^2$) and elongation (%), among mechanical strengths, were measured as the index for the ability to prevent scattering broken pieces of glass.

③ Adhesion of the resin onto the surface of the glass bottle (stability of the coating) was visually evaluated as the index for the formability of a coating layer.

④ Smoothness of the surface of the coating on the bottle was visually evaluated as the index for the degree of complete formation of the coating layer.

Results of the evaluation are listed in Table 1.

The amounts of the materials compounded in the resin composition is shown in Table 1 by weight parts of the solid components.

Viscosity (cps) of a composition diluted with 10 weight parts of water based on 100 weight parts of SBR latex modified with acrylic compounds containing 45 weight % of solid components was measured in the following conditions. Examples 1-4 and Comparative Examples 1 and 2, use a rotor #1 in a BL type viscometer at the rotation speed of 60 rpm; Example 5 uses a rotor #4 in the same viscometer at the rotation speed of 60 rpm; Comparative Example 3 uses a rotor #6 in a BH type viscometer at the rotation speed of 20 rpm; and Comparative Examples 4 and 5 use a rotor #6 in a BH type viscometer at the rotation speed of 2 rpm.

Tensile strength and elongation were measured according to the method of Japanese Industrial Standard K6301, testing methods of physical properties of vulcanized rubber. Stability of the coating was measured by using ten 180 ml glass bottles made by Coca Cola Co., Ltd. which have shallow circumferential undulations at the lower part of the bottles in each testing, dipping the bottles into the solution of the sample resin composition and then visually evaluating the uniformity of the coating layers formed on the surface of the bottles. The evaluation was made by using the following grading classification and assigned point numbers. 5 points: the sample resin composition was easily and uniformly coated on the surface of glass to form the coating layer; 4 points: the sample resin composition was easily coated on the surface of glass to form the coating layer; 3 points: the sample resin composition was coated on all the surface, but with uneven thickness; 2 points: the sample resin composition was coated partially on the surface, but not on all the surface; and 1 point: the sample resin composition was not coated on the surface at all. The average value of the points was used for the evaluation.

Appearance was evaluated by using ten bottles of the same kind as the ones used in the evaluation of stability of coating, dipping the bottles into the solution of the sample resin composition to form the coating layer on the surface of the glass bottles, drying the coating layer by hot air stream of 100° C. at a flow rate of 2 m/sec for 15 minutes and then visually observing the appearance of the coating layer thus visually observing the appearance of the coating layer thus formed. The evaluation was made by using the following grading classification and assigned point numbers. 5 points: completely smooth surface with good gloss; 4 points: smooth surface with good gloss, but less complete than the first grade; 3 points: slight crazes on the surface of the coating layer; 2 points: more crazes on the surface of the coating layer; and 1 point: cracks on the surface of the coating layer. The average value of the points was used for the evaluation.

Ten bottles of the same kind as utilized in the preceding Examples were dipped into the solution of the sample

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| SBR latex (weight parts) | 100 | 100 | 100 | 100 | 100 | 100 | 100 | 100 | 100 | 100 |
| polyvinylpyrrolidone (weight parts) | 0.2 | 0.3 | 0.5 | 0.7 | 1.0 | 0 | 0.1 | 1.4 | 2.0 | 3.0 |
| viscosity (cps) | 30 | 30 | 35 | 40 | 500 | 30 | 30 | 3,000 | 12,500 | 20,000 |
| tensile strength (kg/cm$^2$) | 180 | 185 | 183 | 180 | 175 | 180 | 180 | 170 | 160 | 150 |
| elongation (%) | 500 | 500 | 500 | 500 | 500 | 510 | 510 | 490 | 490 | 490 |
| stability of the coating layer | 5 | 5 | 5 | 4 | 4 | 5 | 5 | 3 | 2 | 1 |
| appearance | 3 | 5 | 5 | 5 | 4 | 1 | 1 | 3 | 2 | 1 |

As clearly shown in Table 1, Examples provided good workability because of low viscosity of the coating solution and gave coating layers effective for preventing the scattering of the broken pieces of glass under fracture because of high tensile strength and high elongation of the coating layers. Production yield in the coating process of glass bottles could be increased because of the good stability of the coating layer. Furthermore, the outer layer could be coated uniformly on the inner layer because of good appearance of the inner coating layer.

EXAMPLES 6-13 AND COMPARATIVE EXAMPLE 6-10

Tests for the properties of the outer coating layer

The following materials were utilized for the preparation of the coating materials of the outer coating layer: (1) as the aqueous polyurethane, Adeka Botaiter HUX-232 (a product of Asahi Denka Kogyo Co., Ltd., having pH of 7-9, viscosity of 30-50 cps (25° C.), molecular weight of about 100,000 and the solid content of 30 weight %); (2) as the aqueous epoxy resin, HUW-XW (a product of Asahi Denka Kogyo Co., Ltd., having pH of 7-9, viscosity of 300-500 cps (25° C.) and the solid content of 53 weight %); (3) as the aqueous amino resin, HUX-11W (a product of Asahi Denka Kogyo Co., Ltd., having pH of 8.2-9.4, viscosity of 2000-5000 cps (25° C.) and the solid content of 74 weight %); and (4) as the surface active agent containing halogen, the following surface active agents containing fluorine: (a) sodium perfluorohexenyloxybenzenesulfonate, (b) an anionic potassium perfluoroalkylcarboxylate, (c) an anionic fluorinated alkyl ester, (d) a cationic salt of perfluoroalkyltrimethylammonium and (e) amphoteric perfluoroalkylbetaine.

The components of each composition were homogeneously mixed in varied amounts as shown in Table 2.

composition, dried in an atmosphere of 100° C. and cured by standing in hot air stream of 150° C. at a flow rate of 2 m/sec for 30 minutes. The cured coating layer thus prepared had thickness of 20 to 30 μm.

For the test of appearance, smoothness of the cured coating layer was visually evaluated. The evaluation was made by using the following grading classification and assigned point numbers. 5 points: the surface was completely smooth with good gloss; 4 points: uneven surface was not found; 3 points: slightly uneven surface was found but the surface had allowable quality as a commercial product; 2 points: considerable uneven surface was found; and 1 point: uneven surface was not found but bubbles were found. The average value of the points was used for the evaluation. Results of the evaluation are listed in Table 2.

TABLE 2

|  | Example | | | | | | | | Comparative Example | | | | |
| --- | --- | --- | --- | --- | --- | --- | --- | --- | --- | --- | --- | --- | --- |
|  | 6 | 7 | 8 | 9 | 10 | 11 | 12 | 13 | 6 | 7 | 8 | 9 | 10 |
| aqueous polyurethane (weight parts) | 100 | 100 | 100 | 100 | 100 | 100 | 100 | 100 | 100 | 100 | 100 | 100 | 100 |
| aqueous epoxy resin (weight parts) | 22 | 22 | 22 | 22 | 22 | 22 | 22 | 22 | 30 | 50 | 70 | 22 | 22 |
| aqueous amino resin (weight parts) | 17 | 17 | 17 | 17 | 17 | 17 | 17 | 17 | 17 | 17 | 17 | 17 | 17 |
| surface active agent containing fluorine |  |  |  |  |  |  |  |  |  |  |  |  |  |
| (a) (weight parts) | 0.05 | 0.1 | 0.3 | 0.5 | 0.8 | 1.0 | 0 | 0 | 0 | 1.3 | 2.0 | 0 | 0 |
| (b) (weight parts) | 0 | 0 | 0 | 0 | 0 | 0 | 0.3 | 0 | 0 | 0 | 0 | 0 | 0 |
| (c) (weight parts) | 0 | 0 | 0 | 0 | 0 | 0 | 0 | 0.3 | 0 | 0 | 0 | 0 | 0 |
| (d) (weight parts) | 0 | 0 | 0 | 0 | 0 | 0 | 0 | 0 | 0 | 0 | 0 | 0.3 | 0 |
| (e) (weight parts) | 0 | 0 | 0 | 0 | 0 | 0 | 0 | 0 | 0 | 0 | 0 | 0 | 0.3 |
| appearance | 4 | 4 | 5 | 5 | 5 | 4 | 5 | 5 | 2 | 1 | 1 | 2 | 2 |

As clearly shown in Table 2, Examples provided smooth surface of the cured coating layer and were excellent in appearance and transparency.

EXAMPLES 14-19 AND COMPARATIVE EXAMPLES 11-13

Tests for properties on washing and preparation

Since glass bottles are washed with alkalis when the glass bottles are utilized repeatedly, the alkali-resistance of the coating layer was evaluated. Since the resin composition for the coating is produced by a batch corresponding to the use of 3 days, storage stability of the resin composition in the condition of the production line was also evaluated.

As the aqueous polyurethane, the aqueous epoxy resin and the aqueous amino resin for preparing the resin composition, the same materials as the ones utilized in the preceding Examples were utilized. As the surface active agent containing fluorine, sodium perfluorohexenyloxy-benzenesulfonate which was utilized in the preceding Examples was also utilized.

The components of each composition were homogeneously mixed in varied amounts as shown in Table 3. Ten bottles of the same kind as utilized in the preceding Examples were dipped into the solution of the sample composition, dried in an atmosphere of 100° C. and cured in hot air stream of 150° C. at a flow rate of 2 m/sec for 30 minutes. The cured coating layer thus prepared had thickness of 20 to 30 μm.

In the evaluation of the mechanical strength, tensile strength and elongation were measured according to the method of Japanese Industrial Standard K6301 in the same manner as in Example 1. Resistance to alkalis was evaluated by dipping the bottle in 3.5% aqueous solution of sodium hydroxide thermostated at 70° C. for 5 hours and then visually evaluating the appearance.

The evaluation was made by using the following grading classification and assigned point numbers. 5 points: no change was found; 4 points: the product turned slightly white; 3 points: the product turned white and cracks were found; 2 points: the product turned remarkably white and cracks were found; and 1 point: coating layer was separated from the substrate. The average value of the points was used for the evaluation.

The storage stability was evaluated by standing at 15° C. for 3 days after the preparation of the composition and then evaluating the easiness of the formation of the coating layer on the surface of the glass bottle.

The evaluation was made by using the following grading classification and assigned point numbers. 5 points: the composition formed the coating layer very easily in the same manner as the composition immediately after the preparation; 4 points: the composition formed the coating layer easily; 3 points: the composition formed the coating layer with difficulty and slightly uneven coating; 2 points: the composition formed uneven coating; and 1 point: the composition did not form coating. The average value of the points was used for the evaluation. The results are listed in Table 3.

TABLE 3

|  | Example |  |  |  |  |  | Comparative Example |  |  |
|---|---|---|---|---|---|---|---|---|---|
|  | 14 | 15 | 16 | 17 | 18 | 19 | 11 | 12 | 13 |
| aqueous polyurethane (weight parts) | 100 | 100 | 100 | 100 | 100 | 100 | 100 | 100 | 100 |
| aqueous epoxy resin (weight parts) | 17 | 20 | 30 | 40 | 50 | 60 | 11 | 14 | 80 |
| aqueous amino resin (weight parts) | 13 | 15 | 25 | 30 | 35 | 40 | 7 | 10 | 45 |
| sodium perfluorohexenyl-oxybenzenesulfonate | 0.2 | 0.2 | 0.2 | 0.2 | 0.2 | 0.2 | 0.2 | 0.2 | 0.2 |
| tensile strength (kg/cm$^2$) | 410 | 430 | 440 | 440 | 450 | 470 | 300 | 350 | 490 |
| elongation (%) | 60 | 45 | 35 | 30 | 25 | 20 | 90 | 80 | 15 |
| resistance against alkali | 4 | 4 | 5 | 5 | 5 | 5 | 1 | 3 | 5 |
| storage stability | 5 | 5 | 5 | 5 | 5 | 4 | 5 | 5 | 2 |
| appearance | 5 | 5 | 5 | 5 | 5 | 4 | 5 | 5 | 3 |

Based on the results of the evaluation obtained above, the glass bottles coated with the inner coating layers utilized in Examples 1–5 were dipped in the compositions for the outer coating layers utilized in Examples 6–13 and Examples 14–19 to form the resin laminates on the surface of the bottles. The glass bottles thus prepared were utilized in the commercial production line for filling the content into the bottles. The bottles did not turn white nor form crack in the washing process. Accordingly, the bottles were very easily handled and the workability was improved to a great extent. The bottles were filled with a carbonate drink to make an inner pressure of 2 kg/cm$^2$. When the bottles were broken by hitting with a hammer, scattering of broken pieces of glass was not observed and the glass bottles thus prepared had a very high degree of safety.

INDUSTRIAL APPLICATIONS

Because the resin laminate for coating of glass of the present invention comprises both the inner coating layer of SBR latex and polyvinylpyrrolidone formed on the surface of the glass, e.g. glass bottle, and the outer coating layer formed by the treatment of the glass having the inner coating layer with a mixture of the aqueous polyurethane, the aqueous epoxy resin, the aqueous amino resin and the surface active agent containing halogen, it provides a glass container having smooth surface and good resistance against alkaline washing solution which is applied in the washing process prior to the filling process. Of course, the resin laminate of the present invention provides a glass container which does not scatter the broken piece of glass even when the glass is broken by an external impact force. The resin laminate can provide window panes in school buildings and the like having very high degree of safety because the broken piece of glass are not scattered even when the window panes are broken. The resin laminate has excellent workability because the coating layer can be formed by merely dipping glass into the solution of the resin composition.

We claim:

1. A glass article having an exterior surface directly bonded to
   a layer (A) formed from a resin composition comprising a styrene-butadiene copolymer latex and polyvinylpyrrolidone wherein the content of the polyvinylpyrrolidone in the resin composition is in the range from 0.2 to 1.0 weight parts based on 100 weight parts of the styrene-butadiene latex, and
   a layer (B) directly bonded to said layer (A), said layer (B) formed from a resin composition comprising an aqueous polyurethane, an aqueous epoxy resin, an aqueous amino resin and a surface active agent containing halogen wherein the contents of the aqueous epoxy resin, the aqueous amino resin and the surface active agent containing halogen in the resin composition are in the ranges from 10 to 60 weight parts, from 10 to 70 weight parts and from 0.05 to 1.0 weight parts, respectively, based on 100 weight parts of the aqueous polyurethane, wherein
   the weight parts of both layers (A) and (B) are based on solid content of the respective components.

2. A glass article as claimed in claim 1, wherein the content of the polyvinylpyrrolidone in the resin composition forming layer (A) is in the range from 0.3 to 0.7 weight parts based on 100 weight parts of the styrene-butadiene latex.

3. A glass article as claimed in claim 1, wherein the contents of the aqueous epoxy resin, the aqueous amino resin and the surface active agent containing halogen in the resin composition forming layer (B) are in the ranges from 15 to 40 weight parts, from 15 to 50 weight parts and from 0.1 to 0.8 weight parts, respectively, based on 100 weight parts of the aqueous polyurethane.

4. A glass article as claimed in claim 1, wherein the content of the polyvinylpyrrolidone in the resin composition forming layer (A) is in the range from 0.3 to 0.7 weight parts based on 100 weight parts of the styrene-butadiene latex and the contents of the aqueous resin, the aqueous amino resin and the surface active agent containing halogen in the resin composition forming layer (B) are in the ranges from 15 to 40 weight parts, from 15 to 50 weight parts and from 0.1 to 0.8 weight parts, respectively, based on 100 weight parts of the aqueous polyurethane.

5. A glass article as claimed in claim 1, wherein the surface active agent containing halogen is a surface active agent containing fluorine in the form of perfluorocarbon group.

6. The glass article as claimed in claim 1, in the form of a glass bottle.

7. The glass article as claimed in claim 1, in the form of a window pane.

* * * * *

UNITED STATES PATENT AND TRADEMARK OFFICE
CERTIFICATE OF CORRECTION

PATENT NO. : 5,326,601
DATED : July 5, 1994
INVENTOR(S) : Nagahiro KAWANO, et al.

It is certified that error appears in the above-indentified patent and that said Letters Patent is hereby corrected as shown below:

On the title page, Item [87], the PCT Publication Number should read as follows:

--WO92/11138--

Signed and Sealed this

Twentieth Day of September, 1994

Attest:

BRUCE LEHMAN

Attesting Officer        Commissioner of Patents and Trademarks